United States Patent Office 2,813,003
Patented Nov. 12, 1957

2,813,003
ALKALINE CARBONATE LEACHING PROCESS FOR URANIUM EXTRACTION

Arvid Thunaes, Ernest Arthur Brown, and Alfred Thomas Rabbitts, Ottawa, Ontario, Canada, assignors, by mesne assignments, to the United States of America as represented by the United States Atomic Energy Commission No Drawing. Application December 9, 1952, Serial No. 325,045

Claims priority, application Canada December 13, 1951

8 Claims. (Cl. 23—14.5)

This invention relates to the separation and recovery of uranium from uranium bearing material and more particularly to an improvement in processes involving leaching with an alkaline carbonate solution.

Both in refinery operation and in the leaching of uranium ores, the solubility of uranium in sodium, potassium, or ammonium carbonate solutions has been relied upon for the separation of uranium. Sodium, potassium, or ammonium carbonate solutions have been directly applied to uranium bearing ores or ore concentrate for the purpose of leaching. In refinery operations this solubility of uranium in sodium, potassium, or ammonium carbonate solutions has been used to separate uranium already taken into solution by acid treatment from compounds and elements which are insoluble in carbonate solutions, chiefly iron. Carbonate is added to an acid solution to precipitate and separate what is known as an "iron residue" while uranium remains in the solution which has been made alkaline by the addition of sodium, potassium, or ammonium carbonate.

The development of a satisfactory method of treatment of uranium ores based upon sodium, potassium, or ammonium carbonate leaching is of particular importance where the ore contains a large proportion of carbonate minerals closely associated with the uranium minerals. In such cases, the close association between the uranium and carbonate minerals may render their separation impractical. Since the theoretical consumption of sulphuric acid is about 45 pounds per ton of ore for each 1% of carbon dioxide in the ore, treatment by acid leaching will involve excessive acid consumption by the carbonate minerals.

And when the uranium content of an ore is predominantly in the form of secondary minerals, the ore is generally not amenable to treatment by conventional methods of gravity concentration because of the friable nature and relatively low density of secondary uranium minerals.

Sodium, potassium or ammonium carbonate leaching processes which have previously been used have not, however, given completely satisfactory recovery of the uranium, particularly where a substantial portion of the uranium occurs in the form of primary uranium minerals.

In accordance with the present invention the uranium bearing material is leached with solution containing a sodium, potassium, or ammonium carbonate preferably sodium or potassium carbonate and also an oxidizing agent which should be a permanganate and preferably sodium, potassium calcium or ammonium permanganate. The presence of bicarbonate ion is beneficial in the treatment of ores containing secondary uranium minerals and it is essential to adequate recovery from primary uranium minerals. This bicarbonate ion may be added with the leaching solution or it may be produced by the reaction of the carbonate in the leaching solution with certain substances occurring naturally in the ore. A further improvement in recovery from primary uranium minerals results from their treatment under pressure and at an elevated temperature.

A process in accordance with the present invention may be used for leaching uranium from secondary uranium minerals such as:

Cummite—hydrous oxides of uranium $UO_3.nH_2O$
Zippeite—a hydrated sulphate of uranium
$$2UO_3.SO_3.5—5H_2O$$
Thucholite—a uranium bearing hydrocarbon of variable uranium content
Autunite—hydrated calcium uranyl phosphate
Torbernite—hydrated copper uranyl phosphate
Carnotite—hydrated potassium uranyl vanadate
Uraniferous opal—hydrated silica of variable uranium content
Trogerite—hydrated uranyl arsenate
Tyuyamunite—hydrated calcium uranyl vanadate The process is also applicable to the leaching of uranium where the uranium occurs to a large extent in the form of $UO_2$ such as in primary minerals, for example, pitchblende and uraninite. Uranium will also be readily leached from certain uranous and uranyl compounds not necessarily in the form of naturally occurring minerals such as, for instance, chemical compounds or precipitates including various pure and impure uranous or Uranyl arsenates
Uranous or uranyl phosphates
Uranous or uranyl oxides, hydroxides or mixtures thereof The type of chemical reaction which takes place in the leaching of secondary minerals and uranous or uranyl compounds may be illustrated by considering the leaching of uranous monohydrogen arsenate.

The reagents used in these examples are sodium carbonate with sodium permanganate as oxidizing agent. It is likely that sodium carbonate and sodium permanganate cause the following reaction which, it will be noted, produces sodium bicarbonate.

(1) $3U(HAsO_4)_2 + 19Na_2CO_3 + 2NaMnO_4 + 2H_2O \rightarrow$
$3Na_4UO_2(CO_3)_3 + 6Na_3AsO_4 + 10NaHCO_3 + 2MnO_2$ Uranium may also be leached from uranous monohydrogen arsenate using bicarbonate solution, the following reaction probably taking place:

(II) $3U(HAsO_4)_2 + 2NaMnO_4 + 28NaHCO_3 \rightarrow$
$3Na_2UO_2(CO_3)_3 + 2MnO_2 + 6Na_3AsO_4 + 19CO_2 + 17H_2O$ Evolution of $CO_2$ gas may occur as well, when normal sodium carbonate is used, through reactions similar to:

(III) $3U(HAsO_4)_2 + 2NaMnO_4 + 14Na_2CO_3 \rightarrow$
$3NaUO_2(CO_3)_3 + 2MnO_2 + 6Na_3AsO_4 + 3H_2O + 5CO_2$ It will be noted that Reaction III is actually a combination of Reactions I and II, since the bicarbonate formed in Reaction I can react further as in Reaction II.

In practice, using sodium, potassium, or ammonium carbonate, it appears that Reactions I and II proceed together but not necessarily to the limit indicated by Reaction III.

Subsequently, the uranium may be precipitated from the leach solution in accordance with the following reactions:

(IV) $3Na_4UO_2(CO_3)_3 + 10NaHCO_3 + 19NaOH \rightarrow$
$3/2Na_2U_2O_7 + 19Na_2CO_3 + 29/2H_2O$
(V) $2Na_4UO_2(CO_3)_3 + 6NaOH \rightarrow$
$Na_2U_2O_7 + 6Na_2CO_3 + 3H_2O$ It will be noted that both in Reactions IV and V sodium carbonate is regenerated and unless impurities encountered in a particular case interfere, the barren solution can be reused for leaching after separation of the uranium precipitate.

The value of sodium bicarbonate in conjunction with the sodium carbonate and an oxidizing agent will be apparent from a consideration of the reaction which takes place when uranium is leached from materials where the uranium occurs to a large extent in the form of $UO_2$ such as in primary minerals. If sodium carbonate alone is used in conjunction with sodium permanganate as an oxidizing agent in the leaching of the primary uranium mineral pitchblende the following equation has to be considered.

(VI) $3UO_2 + 2NaMnO_4 + 9Na_2CO_3 + 4H_2O \rightleftarrows$
$3Na_4UO_2(CO_3)_3 + 2MnO_2 + 8NaOH$ It is evident that sodium carbonate alone is not suitable for the leaching of primary uranium minerals since the products of the reaction would include alkaline hydroxide which will react further with the alkaline uranyl tricarbonate and precipitate a diuranate. However, the use of sodium bicarbonate in conjunction with sodium carbonate and sodium permanganate will produce a reaction in which the soluble uranyl tricarbonate is formed.

$3UO_2 + 2NaMnO_4 + Na_2CO_3 + 8NaHCO_3 \rightarrow$
$3Na_4UO_2(CO_3)_3 + 2MnO_2 + 4H_2O$ Sodium bicarbonate alone, without carbonate, may also react in the presence of an oxidizing agent to leach uranium with the formation of soluble uranyl tricarbonate in accordance with the following reaction:

$3UO_2 + 2NaMnO_4 + 10NaHCO_3 \rightarrow$
$3Na_4UO_2(CO_3) + 2MnO_2 + CO_2 + 5H_2O$ A certain amount of the bicarbonate will often be formed by the reaction of the carbonate with other constituents of the materials being leached by this process and reagent requirements are not in practice determined by the uranium content or form alone. Carbonate may react with ferric sulphate, for example, thereby providing bicarbonate which, as has been indicated above, will be beneficial in the reaction.

$Fe_2(SO_4)_3 + 6Na_2CO_3 + 6H_2O \rightarrow$
$3Na_2SO_4 + 6NaHCO_3 + 2Fe(OH)_3$ Similarly, the carbonate will react with iron sulphide to produce the bicarbonate when air is present.

$2FeS + 9/2 O_2 + 4Na_2CO_3 + 5H_2O \rightarrow$
$2Fe(OH)_3 + 4NaHCO_3 + 2Na_2SO_4$ As a result, the use of carbonate alone may be satisfactory in some cases where primary uranium minerals are being leached, because other reactions not involving uranium may produce bicarbonate for the leaching reaction.

However, if air is not present the reaction of iron sulphide for example, with permanganate, can be detrimental to the leaching of uranium, not only by consuming oxidizing agent but also by formation of sodium, potassium, or ammonium hydroxide $FeS + 3NaMnO_4 + 2H_2O \rightarrow$
$Fe(OH)_3 + 3MnO_2 + Na_2SO_4 + NaOH$ It is therefore evident that bicarbonate should always be present during leaching, so that normal carbonate instead of sodium, potassium, or ammonium hydroxide will be formed by reactions similar to that shown in the above equation.

The addition of sodium hydroxide to the leach solution will precipitate uranium as has been described in connection with the leaching of secondary uranium minerals, sodium carbonate being regenerated simultaneously. If necessary, the carbonate regenerated can be converted to bicarbonate by treating this solution with carbon dioxide. If impurities present do not interfere, the solution can then be reused for leaching.

The material to be leached should be suitably treated in accordance with its nature. When the process is to be used for extraction of uranium from an ore, grinding will generally be a necessary step. The degree of fineness required will depend upon the grain size at which substantially all of the uranium minerals are liberated, that is, made accessible to attack by the leach solution. For instance, in the case of one ore which has been leached by this process, a grind to 60% —325 mesh was sufficient to give maximum extraction.

If a high pulp density is to be used in the subsequent leaching step and the ore has been wet-ground, the ground pulp may be filtered in order to reduce the liquid content.

With some materials it may be advantageous to remove certain constituents by froth flotation. Sulphides and arsenides for instance may consume reagents, and in certain cases it may pay to separate these as a flotation concentrate.

Before leaching some materials it may be advantageous to employ preliminary heating or baking at low temperatures 200–300° C. This would be done in order to dehydrate silicates present and reduce their solubility, and also in some cases to burn off organic matter which could otherwise consume reagents. Too high a content of soluble silicates can make a leach gelatinous and difficult to filter, and it may also interfere with leaching by forming a film over particles of the solids being leached.

The exact conditions of reaction will depend considerably upon the nature of the material being treated. A moderate amount of agitation is usually sufficient. For example, when leaching ores at atmospheric pressure it is generally practical to use the same type of slow speed agitators as are commonly used in the cyanidation process for gold and to operate these with a minimum of rake speed and air.

The time of agitation will depend upon the particular material being treated and is determined by the point at which the value of the uranium extracted per unit time becomes less than the operating cost for the same time. For one type of ore treated by this process, the agitation time thus selected was 24 hours.

Pulp density will have an upper limit determined by the solubility and concentration of reagents required, and the solubility and concentration of products formed in the treatment of a particular material. Generally, a pulp density can be chosen to suit the equipment which may be available, providing as above that the dilution is sufficient to keep the solution from becoming saturated and losing uranium by crystallization or reprecipitation. For instance, if the process is operated in a continuous manner to leach an ore and if continuous rotary vacuum filters are used a pulp density of 3 parts liquids to 4 parts solids is usually convenient for direct handling in such filters. Also the type of agitator mentioned above will generally work well at such a pulp density, when the grind is about 60% —325 mesh. Pulp temperature to be maintained in agitation will depend upon the particular material to be leached. For instance in the case of an ore in which the uranium occurs predominantly in the form of secondary minerals, it has been found that temperatures in the range 50°–100° C. will give efficient extraction of uranium. It has also been found that in the case of ores and concentrates in which the uranium occurs predominantly in the form of primary minerals, a temperature in the range 100°–200° C. will give efficient extraction of uranium, such temperatures being obtained by leaching under pressure.

The pressure under which agitation should be carried out will also depend upon the material to be leached. In the case of an ore where the uranium occurs predominantly in the form of secondary minerals, leaching at atmospheric pressure has given good extraction. In the case of an ore where uranium occurs predominantly in the form of primary minerals, the best results have been obtained by leaching in a closed vessel, so that the pressure can build up naturally to the value corresponding to the temperature of the pulp. For example, substantially 100% extraction of uranium from a pitchblende ore has been obtained by leaching at 200° C. in a closed vessel. The pressure generated naturally by the confined pulp at this temperature was close to 200 p. s. i. g.

After agitation has been completed the pulp is filtered to separate the residual leached solids from the solution. Any convenient type of filter may be used. The filter cake is washed with dilute sodium, potassium, or ammonium carbonate solution in order to displace the portion of the original leach solution retained as moisture by the filter cake. It is preferable to use a two stage washing of the filter cake. In this, the cake is given one replacement wash immediately after the leach solution has been filtered off, and the filtrate resulting from this initial washing is combined with the initial leach filtrate since its composition will approximate that of the leach filtrate. The filter cake is then repulped with dilute alkaline carbonate solution, and filtered again. The cake is washed on the filter with another replacement wash of dilute sodium, potassium, or ammonium carbonate solution and finally with water.

In some cases this second filtrate can be recycled and reused in leaching, while the first filtrate only is treated for recovery of uranium.

The purpose of the washing is to displace leach liquor retained by the cake and also to pick up any uranium which may have reprecipitated due to hydrolysis.

In the treatment of high grade materials such as, for instance, uranous or uranyl arsenates and other chemical compounds or precipitates mentioned previously, it may often be desirable to use an additional repulping, filtering and washing stage, because of the relatively high concentration of uranium.

The suitability of the process in accordance with this invention for the extraction of uranium from an ore may be illustrated by the consideration of an actual example of the treatment of an ore.

*Example 1.*—Treatment of the ore by the process in accordance with this invention was indicated by the following findings:

I. Measurement of beta and gamma activities showed that the ore was not in radioactive equilibrium and suggested the presence of secondary uranium minerals.

II. Through mineralogical examination any uranium present as unaltered pitchblende was estimated to be less than 5% of the total.

III. Gravity concentration tests showed that this ore was definitely not amenable to concentration by gravity methods.

IV. The ore contains 24% $CO_2$ as carbonate minerals, closely associated with the uranium minerals. Suitable separation of the carbonate minerals is not possible because of their close association with the uranium minerals. Acid leaching is therefore ruled out, since the acid consumed by the carbonate minerals would be excessive.

Initial tests showed that good extractions of uranium could be obtained by leaching this ore with hot 5% sodium carbonate solution, using potassium permanganate as the oxidizing agent.

Subsequently a test was carried out following a batch cyclic flowsheet. The data from one cycle of this test will serve to illustrate how the process may be applied to the leaching of an ore of this type.

In this particular batch cyclic test the ore was ground to approximately 85% $-325$ mesh and leached at a dilution of 1 part solids to 3 parts carbonate solution. The pulp was agitated and heated to 100° C. for 30 minutes, after which it was filtered. The filter cake was then repulped and agitated for 15 minutes with the addition of 1 part carbonate solution to 1 part ore. The pulp was refiltered and the filter cake was washed on the filter with hot water, 0.3 part to 1 part ore.

A portion of the first filtrate (leach filtrate) equal in volume to the second filtrate (wash filtrate) was removed as finished solution for precipitation of uranium. The remainder of the leach filtrate was combined with the wash filtrate and recycled to leach the next batch of ore.

In the first cycle only, sodium carbonate was added to the leach to give a concentration of 5% sodium carbonate. Thereafter the only sodium carbonate entering the leach was in the washing stage. Potassium permanganate, 8 lbs. per ton of ore was added to the leach agitation in each cycle.

In the sixteenth cycle, leaching ore according to the circuit described above, the residue from the second filtration assayed 0.045% $U_3O_8$. Calculated head for the ore entering this cycle was 0.49% $U_3O_8$ and extraction was therefore 92%.

By the addition of caustic, uranium was precipitated from leach filtrate taken off in each cycle. Addition of 2 parts NaOH to each part $U_3O_8$ in the leach solution was sufficient to precipitate 98.9% of the uranium as a uranate of sodium which had a grade of 75% $U_3O_8$.

With an extraction of 92% in leaching and a recovery of 98.9% in precipitation, the overall recovery in the treatment of the ore by the process is 0.92×98.9=91%.

The barren solution resulting from precipitation contains sodium carbonate regenerated by addition of caustic. By reusing this solution in the washing stage of the leaching circuit, no addition of carbonate is required, beyond that used to start up the operation and maintain the required carbonate concentration. The reagent requirement in this instance would become 20 lbs. caustic and 8 lbs. $KMnO_4$ per ton ore plus any addition of carbonate required to make up for solution lost such as solution lost as moisture in the leach residue, or barren solution necessarily discarded to maintain volume balance or to prevent build up of impurities.

The leaching of ores containing primary uranium minerals may be illustrated by a description of an example of the leaching of pitchblende ores.

*Example 2.*—High grade pitchblende (53.0% $U_3O_8$) was ground to $-100$ mesh and treated in an autoclave for 4 hours at 200° C. The pressure built up naturally at this temperature was about 200 p. s. i. g. Proportions of pitchblende, water and reagents were:

|  | Parts |
|---|---|
| Pitchblende | 5 |
| $NaHCO_3$ | 13 |
| $(NH_4)_2CO_3$ | 6 |
| Water | 220 |
| $KMnO_4$ | 1.25 |

The extraction of uranium was 98%. This extraction of uranium may be compared with the results obtained in the absence of the permanganate carried out under identical conditions which gave only 57% extraction and with another identical leach which differed in that 22 parts of carbonate and no bicarbonate was used giving only 60% extraction. The preceding example demonstrates that the present process will give quantitative extraction of uranium from high grade unaltered pitchblende. In ores, however, the uranium content is much lower than in the preceding example and lower proportions of reagents will give quantitative extraction of uranium.

*Example 3.*—In the following test an ore containing 0.74% $U_3O_8$ a primary unaltered pitchblende was treated. The reaction was carried out in an autoclave at 200° C. and was of 4 hours' duration. The pressure generated by the pulp at this temperature was close to 200 p. s. i. g. In each case 200 parts of ore ($-100$ mesh) were treated using 400 parts of water. The proportions of reagents added were varied as below:

| Test | Alkaline Carbonate | Oxidizing Agent | Percent $U_3O_8$ Extraction |
|---|---|---|---|
| 1 | 16 parts $NaHCO_3$ | 3 parts $KMnO_4$ | 43 |
| 2 | 26 parts $NaHCO_3$ | do | 57 |
| 3 | 50 parts $NaHCO_3$ | do | 68 |
| 4 | 100 parts $NaHCO_3$ | do | 71 |
| 5 | 50 parts $NaHCO_3$ | nil | 26 |
| 6 | do | 3 parts $KMnO_4$ | 68 |
| 7 | do | 10 parts $KMnO_4$ | 81 |
| 8 | do | 20 parts $KMnO_4$ | 100 |

Tests 1 to 4 show that in the treatment of this ore there was only slight improvement in extraction when the concentration of sodium bicarbonate was raised above 12½%. The necessity for the oxidizing agent is clearly illustrated in tests 5 to 8 inclusive.

*Example 4.*—Tests similar to those described in Example 3 were made on the same ore using various oxidizing agents. 200 parts of ore were mixed with 400 parts of water and 16 parts of sodium bicarbonate and were treated for 4 hours at 200° C. in an autoclave at 200 p. s. i. g. It was discovered that permanganate was more effective than any of the following oxidizing agents:

Ammonium persulphate
Manganous nitrate
Hydrogen peroxide
Sodium nitrate
Manganese dioxide The extractions of uranium are shown in the following table:

| Test | Oxidizing Agent | Percent $U_3O_8$ Extracted |
| --- | --- | --- |
| 9 | 3 parts $(NH_4)_2S_2O_8$ | 16 |
| 10 | 2 parts $Mn(NO_3)_2$ | 20 |
| 11 | 14 parts 30% $H_2O_2$ | 22 |
| 12 | 2 parts $NaNO_3$ | 22 |
| 13 | none | 22 |
| 14 | 2 parts $MnO_2$ | 26 |
| 15 | 1 part $KMnO_4$ | 31 |
| 16 | 3 parts $KMnO_4$ | 43 |

Additional information on the effectiveness of various oxidizing agents was obtained through a series of tests in which an ore containing secondary uranium minerals was leached by boiling with sodium carbonate solution in the presence of the oxidizing agent. It was found that when permanganate was used the extraction of uranium was better than when comparable quantities of the following reagents were used:

Sodium peroxide
Potassium chlorate
Bleaching powder
Potassium nitrate
Sodium nitrate
Sodium perborate
Hydrogen peroxide
Potassium dichromate It is believed that the manganese dioxide which forms when the permanganate reacts, may affect the overall leaching reaction in a catalytic manner and thereby account for the superior effectiveness of permanganate as oxidizing agent in this process.

The foregoing results have demonstrated that with appropriate variations in conditions of temperature and pressure this process can have a wide application as a means for efficient extraction of uranium by leaching.

Due to natural variations in the character of individual ores and in the composition of other materials from which uranium may be extracted by this process, it is not possible to define any fixed proportions or quantities of reagents nor any fixed conditions of temperature and pressure as being those which will give the optimum or most economic extraction in every case. However, the practice best suited to a particular application of the process can be determined readily by tests.

We claim:

1. In a process for separating uranium from uranium bearing material, the step of leaching with a solution containing a substance selected from the group consisting of sodium, potassium and ammonium carbonates, bicarbonate ion and a permanganate of a substance selected from the group consisting of sodium, potassium, calcium and ammonium.

2. A process as in claim 1 in which sufficient of said bicarbonate ion is present substantially to prevent the formation of sodium, potassium or ammonium hydroxide.

3. In a process for leaching uranium from material containing secondary uranium minerals, the step of leaching with a solution containing a permanganate of a substance selected from the group consisting of sodium, potassium, calcium and ammonium, a carbonate of a substance selected from the group consisting of sodium, potassium and ammonium, and a sufficient amount of bicarbonate ion substantially to prevent the formation of sodium, potassium or ammonium hydroxide.

4. In a process for leaching uranium from material containing primary uranium minerals, the step of leaching with a solution containing a permanganate of a substance selected from the group consisting of sodium, potassium, calcium and ammonium, a carbonate of a substance selected from the group consisting of sodium, potassium and ammonium, and a sufficient amount of bicarbonate ion substantially to prevent the formation of sodium, potassium or ammonium hydroxide.

5. In a process for leaching uranium from material containing secondary uranium minerals, the step of leaching with a solution containing for each three gram equivalents of uranium at least one mol of a permanganate of a substance selected from the group consisting of sodium, potassium, calcium and ammonium, and in which there is present a substance selected from the group consisting of sodium, potassium and ammonium carbonates, and bicarbonate ion, sufficient of said bicarbonate ion being present substantially to prevent the formation of sodium, potassium or ammonium hydroxide.

6. In a process for leaching uranium from material containing primary uranium minerals, the step of leaching with a solution containing at least one mol of a permanganate of a substance selected from the group consisting of sodium, potassium, calcium, and ammonium, and in which there is present a substance selected from the group consisting of sodium, potassium, and ammonium carbonates, and bicarbonate ion, sufficient of said bicarbonate ion being present substantially to prevent the formation of sodium, potassium, or ammonium hydroxide.

7. A process as in claim 6 in which the leaching is carried out at a temperature of about 200° C. and at a pressure of about 200 p. s. i. g.

8. A process for separating uranium from uranium bearing material comprising the steps of leaching with a solution containing a permanganate of a substance selected from the group consisting of sodium, potassium, calcium and ammonium and a substance selected from the group consisting of sodium, potassium and ammonium carbonates, and bicarbonate ion, sufficient of said bicarbonate ion being present substantially to prevent the premature formation of sodium, potassium or ammonium hydroxide, and precipitating uranium from the resulting leach solution with a substance selected from the group consisting of sodium hydroxide and potassium hydroxide.

References Cited in the file of this patent

UNITED STATES PATENTS

| | | |
| --- | --- | --- |
| 1,999,807 | Gibbs | Apr. 30, 1935 |
| 2,597,504 | Larsson | May 20, 1952 |

OTHER REFERENCES

Bloecher: U. S. Atomic Energy Comm. declassified Paper No. ACCO–27, October 20, 1952, declassified September 23, 1955, 27 pages; pages 5, 12, and 13 particularly relied on.